US006622183B1

United States Patent
Holm (10) Patent No.: US 6,622,183 B1
(45) Date of Patent: Sep. 16, 2003

(54) DATA TRANSMISSION BUFFER HAVING FRAME COUNTER FEEDBACK FOR RE-TRANSMITTING ABORTED DATA FRAMES

(75) Inventor: Jeffrey J. Holm, Eden Prairie, MN (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/532,148

(22) Filed: Mar. 21, 2000

(51) Int. Cl.⁷ .............................................. G06F 13/00
(52) U.S. Cl. .............................. 710/34; 710/33; 710/52; 710/57
(58) Field of Search ........................ 710/34, 33, 52, 710/57; 709/250; 713/1

(56) References Cited

U.S. PATENT DOCUMENTS

| | | | |
|---|---|---|---|
| 4,847,750 A | 7/1989 | Daniel ........................ | 364/200 |
| 5,163,136 A | 11/1992 | Richmond ................... | 395/275 |
| 5,414,813 A | 5/1995 | Shiobara ..................... | 395/200 |
| 5,542,110 A | 7/1996 | Minagawa ................... | 395/287 |
| 5,553,302 A * | 9/1996 | Morrissey et al. ............. | 710/5 |
| 5,619,497 A | 4/1997 | Gallagher et al. .......... | 370/394 |
| 5,673,416 A | 9/1997 | Chee et al. ................... | 395/478 |
| 5,708,779 A * | 1/1998 | Graziano et al. ........... | 709/250 |
| 5,717,952 A | 2/1998 | Christiansen et al. ....... | 395/842 |
| 5,818,468 A | 10/1998 | Le Cornec et al. ......... | 345/521 |
| 5,903,283 A | 5/1999 | Selwan et al. .............. | 345/521 |
| 5,970,069 A | 10/1999 | Kumar et al. ............... | 370/402 |
| 6,105,086 A * | 8/2000 | Doolittle et al. .............. | 710/52 |
| 6,154,796 A * | 11/2000 | Kuo et al. ..................... | 710/52 |
| 6,397,273 B2 * | 5/2002 | Chilton ........................ | 710/52 |
| 6,502,189 B1 * | 12/2002 | Westby .......................... | 713/1 |

OTHER PUBLICATIONS

"MU95C5480 LANCAM," *Music Semiconductors*, Rev. 0, pp. 1–12. (Jul. 22, 1994).
"Information technology—Telecommunications and information exchange between systems—High-level data link control (HDLC) procedures—Elements of procedures," *ISO/IEC 4335*, Fifth edition. (Dec. 15, 1993).
"Information technology—Telecommunications and information exchange between systems—High-level data link control (HDLC) procedures—Frame structure," *ISO/IEC 3309*, Fifth editon. (Dec. 15, 1993).
W. Simpson, Editor, Daydreamer, "PPP in HDLC–like Framing," pp. 1–25, (last modified Jul. 1994) <ftp://ds.internic.net/rfc>.

* cited by examiner

*Primary Examiner*—Jeffrey Gaffin
*Assistant Examiner*—Harold Kim
(74) *Attorney, Agent, or Firm*—Westman, Champlin & Kelly (57) ABSTRACT

A data transmission buffer circuit is provided for buffering communication data, which is divided into a plurality of multiple-bit data frames that have a start and an end. The buffer circuit includes a first-in-first-out (FIFO) buffer and a frame counter. The FIFO buffer has a write port and a read port. The write port includes a data input, a write control input and an end-of-frame flag input, which indicates whether data on the data input includes the end of one of the data frames. The read port includes a data output, a read control input, and an end-of-frame flag output, which indicates whether data on the data output includes the end of one of the data frames. The frame counter is coupled to the write port and the read port and generates a frame count output that represents a number of the data frames stored in the FIFO buffer.

14 Claims, 5 Drawing Sheets

BMD Pointer and Linked BMD List Structure

FIG. 3

Buffer Memory Descriptor (BMD) Definition

| Hex Offset | Description | msb 31 Byte 0 24 | 23 Byte 1 16 | 15 Byte 2 8 | 7 Byte 3 lsb 0 |
|---|---|---|---|---|---|
| 0000 | Word 0 | Not Used | | Flags | |
| 0004 | Word 1 | Byte Count | | Not Used | |
| 0008 | Word 2 | Buffer Memory Address | | | |
| 000C | Word 3 | Next BMD Pointer | | | |

FIG. 6

DATA TRANSMISSION BUFFER HAVING FRAME COUNTER FEEDBACK FOR RE-TRANSMITTING ABORTED DATA FRAMES

CROSS-REFERENCE TO RELATED APPLICATIONS

Cross-reference is made to U.S. patent application Ser. No. 09/532,148, which is-entitled "DATA COMMUNICATION CIRCUIT HAVING FIFO BUFFER WITH FRAME-IN-FIFO GENERATOR" and was filed on even data herewith.

BACKGROUND OF THE INVENTION

The present invention relates to data communication circuits. More particularly, the present invention relates to a data communication circuit having a transmit first-in-first-out (FIFO) buffer, which assists in re-transmitting aborted data frames.

Data communication circuits such as network devices and telecommunications circuits typically have several communication channels for connecting to multiple devices such as workstations, telephone and television systems, video teleconferencing systems and other facilities over common data links or carriers. A channel is a logical path from one source to one destination and can be unidirectional or bidirectional. A data routing circuit, such as a direct memory access (DMA) controller, routes data to and from each channel. The data is usually grouped into frames, or packets, of any size. Each channel includes a data interface controller, such as a serial wide area network (SWAN) controller or a local area network (LAN) controller that is coupled to the data routing circuit for controlling transmission of its respective data over the data link or carrier.

Data interface controllers are often configured to transmit frames or packets of data having an arbitrary length at a fixed speed. For example, a WAN controller may transmit an Internet Protocol (IP) packet over a fixed speed Interactive Services Digital Network (ISDN) Basic Rate Interface (BRI) using high level data link control (HDLC) framing. Alternatively, a LAN controller such as an Ethernet controller may transmit an IP packet over a fixed speed 10 or 100 Mbps LAN, for example.

In these applications, it is common to use a first-in-first-out (FIFO) memory for buffering transmit and receive data between the data routing circuit and data interface controller. Each communication channel typically has its own transmit FIFO and its own receive FIFO. A typical FIFO uses a dual port random access memory (RAM) for storing the data. One port is used by the data interface controller and the other port is used by the data routing circuit. During a transmit operation, the data routing circuit writes the data packets to one end of the FIFO at a data routing circuit transmission rate, and the data interface controller reads the packets at the other end of the FIFO at the rate of the fixed speed data interface.

The FIFO is needed because the data routing circuit transmission rate is generally substantially higher on average than the rate of the fixed speed data interface. Also, the data routing circuit is subject to "gaps" in its ability to feed the FIFO because of memory access latencies, contention with other master devices that are coupled to the memory bus and control logic overhead.

Each FIFO is accompanied by control logic that requests service from the data routing circuit when the amount of data in the FIFO drops below a certain point, such as an "almost empty" threshold. This amount is chosen such that even with worst-case memory access latency, bus contention and control overhead the data in the FIFO will not be completely drained by the fixed speed data interface. The fixed speed data interface controller is typically configured to start extracting data from the FIFO only after a set amount of data is in the FIFO. Once the data interface controller has started transmitting, it must continue transmitting until the end of the frame. During a receive operation, the data interface controller writes the data packets at one end of the FIFO at the rate of the fixed speed data interface, and the Data routing circuit reads the data packets from the other end of the FIFO at the DMA transmission rate. The Data routing circuit waits until there is a sufficient amount of data stored in the FIFO before reading a data packet from the FIFO. This allows the data routing circuit to read an entire packet or frame from the FIFO in a "burst mode" at the Data routing circuit transfer rate.

Ethernet networks are currently the most popular local area networks (LANs). In half-duplex mode, data transfer collisions over an Ethernet channel occur on a regular basis. Occasionally, excessive collisions or late collisions occur when the channel is broken or overloaded, for example. When excessive or late collisions occur, the data frame being transmitted from the transmit FIFO buffer is aborted. The software used by higher level protocols attempts to determine which data frame was aborted and how to respond. For example, the aborted data frame may be recovered through redundancy or other known methods.

Typically, it would be beneficial to re-transmit the aborted data frame. However, since several data frames may be queued-up in the transmit FIFO buffer, the software used by the higher level protocols has no way of knowing which data frame was aborted. In some systems, the software makes a "guess" as to which data frame or frames should be re-transmitted. This could result in some "good" data frames being transmitted twice. Also, if higher level protocols are used to determine the missing packet, large data transmission latencies could result.

The transmit FIFO buffer and communication circuit of the present invention addresses these and other problems and offers other advantages over the prior art.

SUMMARY OF THE INVENTION

One aspect of the present invention is directed to a data transmission buffer circuit for buffering communication data, which is divided into a plurality of multiple-bit data frames that have a start and an end. The buffer circuit includes a first-in-first-out (FIFO) buffer and a frame counter. The FIFO buffer has a write port and a read port. The write port includes a data input, a write control input and an end-of-frame flag input, which indicates whether data on the data input includes the end of one of the data frames. The read port includes a data output, a read control input, and an end-of-frame flag output, which indicates whether data on the data output includes the end of one of the data frames. The frame counter is coupled to the write port and the read port and generates a frame count output, which represents a number of the data frames that are stored in the FIFO buffer.

Another aspect of the present invention is directed to a communications subsystem for transmitting communication data, which is divided into a plurality of multiple-bit data frames that have a start and an end. The subsystem includes a data bus, a register bus, a processor, a data routing circuit, a data interface controller, a transmit first-in-first-out (FIFO) buffer, and a frame counter. The processor and the data routing circuit are coupled to the data bus and the register bus. The transmit FIFO buffer is coupled between the data routing circuit and the data interface controller and has storage locations adapted to store successively received ones of the data frames from the data routing circuit. The frame counter has a count control input, which is coupled to the transmit FIFO buffer, and a count output, which is coupled to the register bus for access by the processor and represents a number of the data frames that are stored in the transmit FIFO.

Yet another aspect of the present invention is directed to a method of re-transmitting an aborted one of a plurality of multiple-bit data frames in a communications subsystem. The method includes: retrieving successive ones of the data frames from a memory; transferring the successive ones of the data frames to a transmit first-in-first-out buffer; transmitting the successive ones of the data frames from the transmit FIFO buffer to a communications channel sequentially, wherein transmission of the aborted data frame is discontinued; counting a number of the successive ones of the data frames that remain in the transmit FIFO after transmission of the aborted data frame has been discontinued; identifying the aborted data frame based on the number; and transferring the aborted data frame from the memory to the transmit FIFO buffer again, after the step of identifying, for re-transmission through the channel.

DETAILED DESCRIPTION OF ILLUSTRATIVE EMBODIMENTS

Figure 1:
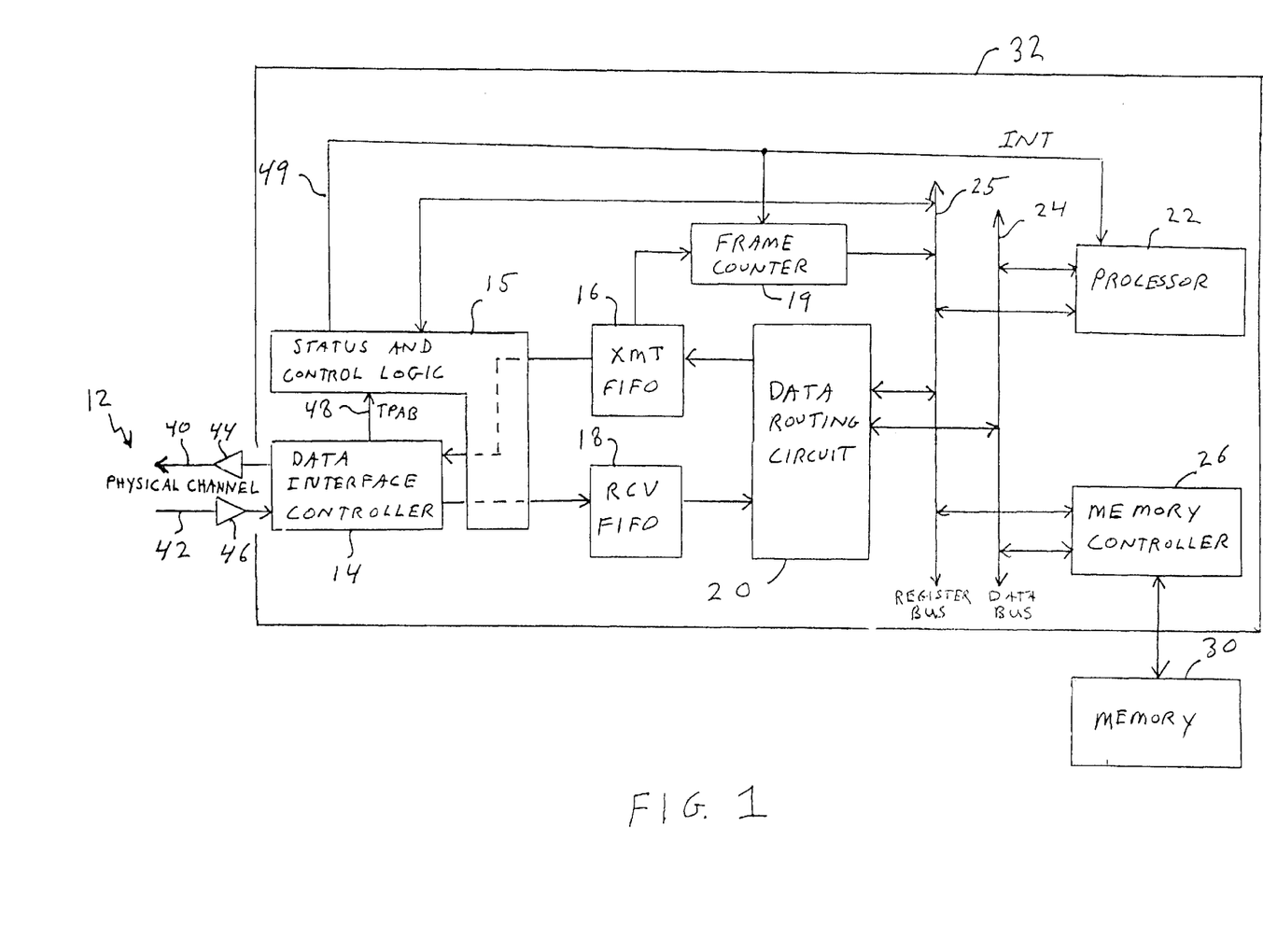
FIG. 1 is a block diagram of a data communication circuit, according to one embodiment of the present invention.

FIG. 1 is a block diagram of a data communication circuit according to one embodiment of the present invention. Data communication circuit 10 includes physical channel 12, data interface controller 14, status and control logic 15, transmit first-in-first-out (FIFO) buffer 16, receive FIFO buffer 18, frame counter 19, data routing circuit 20, such as a direct memory access (DMA) controller, processor 22, data bus 24, register bus 25, memory controller 26 and memory 30. In one embodiment, data interface controller 14, status and control logic 15, transmit and receive FIFOs 16 and 18, frame counter 19, DMA controller 20, processor 22, buses 24 and 25 and memory controller 26 are all fabricated on a single semiconductor integrated circuit 32, such as an application specific integrated circuit (ASIC).

Physical channel 12 includes a transmit data link or carrier 40 and a receive data link or carrier 42, which are coupled to Physical Layer (PHY) devices 44 and 46, respectively, for interfacing with transmit and receive data links 40 and 42. PHY devices 44 and 46 conform to a Media Independent Interface (MII) specification. In one embodiment, physical channel 12 includes an ISDN line or frame relay (T1/E1 or fractional T1/E1) line, for example.

Data interface controller 14 controls data communication between DMA controller 20 and physical channel 12 along one or more logical channels. Data interface controller 14 can include a WAN controller, for example, which transmits an Internet Protocol (IP) packet over a fixed speed interactive services digital network (ISDN) Basic Rate Interface (BRI) using high level data link control (HDLC) framing. Alternatively, data interface controller 14 can include a LAN controller, such as an Ethernet controller, which an IP packet over a fixed speed 10 or 100 Mbps LAN, for example. Other protocols can also be used. In one embodiment, data interface controller 14 is based on LSI Logic Corporation's E-110 Core. The E-110 Core provides the Media Access Control (MAC) layer for Fast Ethernet (100BASE-T) networks. Other types of Ethernet controllers can also be used.

Status and control logic 15 interfaces with data interface controller 14 and acts as an interrupt handler between controller 14 and processor 22. For example, status and control logic 15 can maintain one or more interrupt status registers, which are applied to register bus 25 for access by processor 22.

Data interface controller 14 is coupled to DMA controller 20 through transmit FIFO 16 and receive FIFO 18. Transmit FIFO 16 and receive FIFO 18 each include a random access memory (RAM) device for buffering data between data interface 14 and DMA controller 20. The memory locations within each RAM device are divided into blocks, or "queues", of any size with one queue being associated with a corresponding one of the logical channels. For simplicity, the following discussion will assume that transmit FIFO 16 and receive FIFO 18 each have a single logical channel. However, any number of logical channels can be used with the present invention.

DMA controller 20 is coupled to processor 22 and memory controller 26 over data bus 24 and register bus 25. DMA controller 20 operates as a data routing circuit under the control of processor 22 and routes transmit data in multiple-bit data frames or packets from external memory 30 to the logical channel in transmit FIFO 16. DMA controller 20 also routes receive data from the logical channel in receive FIFO 18 to external memory 30, to another device coupled to data bus 24, or to a logical channel within transmit FIFO 18. DMA controller 20 transfers each data frame or packet a byte or word at a time (or any other number of bits) at the DMA transfer rate until the entire data frame has been transferred. A "burst" of multiple transfers is very efficient since DMA controller 20 has a very high transfer rate. DMA controller 20 notifies processor 22 only when the data transfer of the entire data frame is complete. Data routing circuits other than a DMA controller, such as a processor or a switch fabric device (such as an Ethernet switch) can also be used in alternative embodiments of the present invention.

Memory controller 26 is coupled between data bus 24 and external memory 30 for controlling data transfers to and from memory 30 by DMA controller 20 and processor 22. Memory controller 26 is also coupled to register bus 25. Memory controller 26 can be located on integrated circuit 32 or can be a separate module from integrated circuit 32.

During a receive operation, a multiple-bit data frame is received by data interface controller 14 over physical channel 12. Data interface controller 14 receives the data frame and passes successive words or bytes of the data frame to successive storage locations within receive FIFO 18 until the entire data frame has been stored. When there is a sufficient amount of data within receive FIFO 18, DMA controller 20 begins retrieving the words or bytes from receive FIFO 18 and stores the words or bytes in memory 30 until the entire data frame has been extracted from receive FIFO 18. DMA controller 20 then notifies processor 22 that the data transfer is complete. Alternatively, DMA controller 20 can route the received data frame to another device coupled to data bus 24, to transmit FIFO 16 or to another DMA controller.

Processor 22 can include an on-chip Reduced Instruction Set (RISC™) processor, such a MIPS CW4011 MiniRISC™ Superscalar Processor Core available from LSI Logic Corporation. Alternatively, processor 22 can include an off-chip processor, such as an i486 or i960 microprocessor manufactured by Intel Corporation. Other processors can also be used. Memory 30 can include a variety of memory types, such as a dynamic random access memory (DRAM), a static RAM or a flash memory, for example.

During a transmit operation, processor 22 notifies DMA controller 20 that there is a data frame in memory 30 to be transferred through transmit FIFO 16. DMA controller 20 passes successive words or bytes of the data frame from memory 30, through memory controller 26 to successive storage locations within transmit FIFO 16. DMA controller 20 adds an end-of-frame (EOF) flag to each successive word or byte stored in transmit FIFO 16, which is active when the word or byte is the end of a data frame. DMA controller 20 continues to pass each successive word or byte of the data frame until the entire data frame has been transferred or transmit FIFO 16 is full, as indicated by an "almost full" status flag set by transmit FIFO 16.

When a sufficient amount of data is stored in transmit FIFO 16, data interface controller 14, transmit FIFO 16 asserts a "start" flag, which notifies data interface controller 14 that it can begin retrieving the stored words or bytes at a constant rate, beginning with the first word or byte that was passed by DMA controller 20, until the entire data frame has been extracted from transmit FIFO 16, as indicated by the EOF flag. Data interface controller 14 adds any necessary header information such as address and control information to the data, frames the header and data according to the selected protocol and then transmits the framed header and data through physical channel 12.

Transmit FIFO 16 is needed because the rate that DMA controller 20 feeds transmit FIFO 16 is different on average than the fixed rate at which data interface controller 14 retrieves data from transmit FIFO 16. Also, DMA controller 20 is subject to "gaps" in its ability to feed transmit FIFO 16 because of access latencies of memory 30, contention on system bus 24 with other bus masters such as processor 22, service of other logical channels in transmit FIFO 16 and control logic overhead.

Frame counter 19 is coupled to transmit FIFO 16 for counting the number of data frames stored within the FIFO, which can be used by processor 22 to identify data frames that are aborted during transmission by data interface controller 14. Frame counter 16 counts the number of active EOF flags written into FIFO 16 (WR_CNT) and the number of EOF flags read from FIFO 16 (RD_CNT). The total number of data frames in FIFO 16 is the difference between the two (WR_CNT-RD_CNT). In one embodiment, frame counter 19 latches the frame count in a register, which is applied to register bus 25 for access by processor 22. Alternatively, frame counter 19 applies the frame count directly to an input of processor 22.

When data interface controller 14 aborts the transmission of a data frame or packet, data interface controller 14 notifies processor 22 through status and control logic 15 by setting an abort status flag 48. For example, an E-110 Ethernet core asserts a Transmit Packet Abort (TPAB) flag to an active state when transmission of a data frame or packet has been discontinued. This can occur when physical channel 12 is broken or overloaded, for example. The TPAB flag remains asserted until the E-110 Ethernet core receives a request to transmit from processor 22.

Status and control logic 15 receives the abort flag 48 from data interface controller 14, updates an interrupt register maintained by the logic and activates an interrupt signal INT on output 49, which is applied to processor 22. In a typical circuit, status and control logic 15 would logically OR several status flags together to generate interrupt signal INT on output 49. Processor 22 then reads the interrupt registers over register bus 25 to identify the particular interrupt and take necessary action. In one embodiment, the interrupt signal INT on output 49 is also coupled to the clock input of a latch within frame counter 19. This latch latches the frame count when the interrupt signal INT goes active. The frame count is then stable and can be read by processor 22 over register bus 25 for identifying the particular data frame that was aborted.

Figure 2:
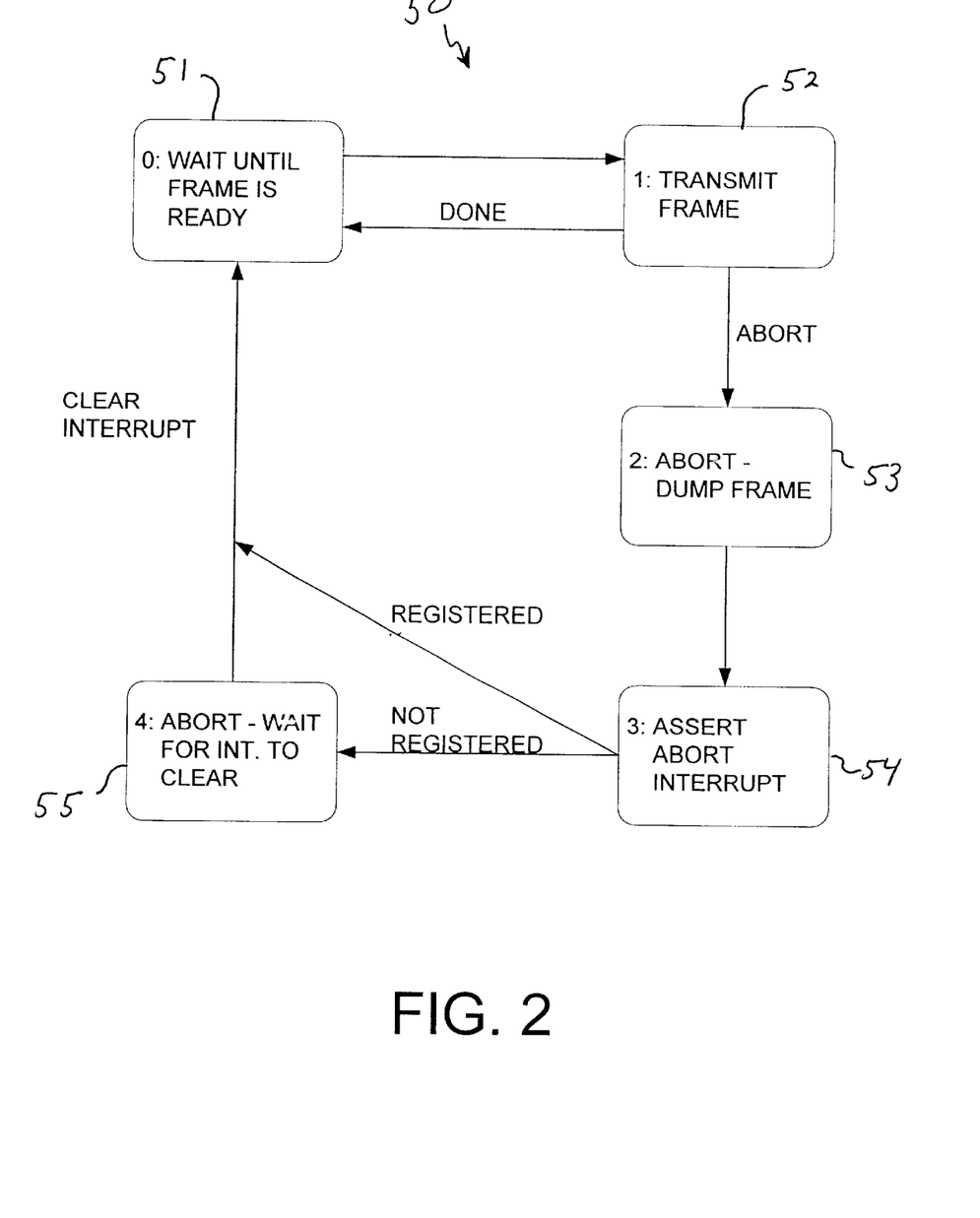
FIG. 2 is a state diagram, which illustrates various states and actions implemented by status and control logic within the circuit shown in FIG. 1.

FIG. 2 is a state diagram, which illustrates various states and actions implemented by status and control logic 15 with respect to aborted frames. State diagram 50 includes states 51–55. At state 51, status and control logic 15 waits until a data frame is ready to be transmitted from transmit FIFO 16. When a data frame is ready, such as when transmit FIFO 16 asserts a "start" flag, status and control logic 15 transitions to state 52 and transmits the data frame from transmit FIFO 16 through data interface controller 14 as described above. When the data frame has been successfully transmitted by data interface controller 14, status and control logic 15 returns to state 51 to wait for another data frame.

When status and control logic 15 receives a transmit abort flag 48 from data interface controller 14 during transmission of a data frame in state 52, the logic transitions from state 52 to state 53. At state 53, status and control logic 15 "dumps" the remainder of the aborted data frame from transmit FIFO 16 by reading the remainder of the data frame without transferring the remainder to data interface controller 14 for transmission through physical channel 12. Once the end of the aborted data frame and its corresponding EOF flag have been read from transmit FIFO 16, the frame count at the output of frame counter 19 is stable and reflects the number of remaining data frames in FIFO 16.

Status and control logic 15 transitions to state 54 and asserts the interrupt signal INT on output 49 (shown in FIG. 1), which is detected by processor 22. The interrupt signal INT also latches the frame count at the output of frame counter 19. At this state, the next data frame to be transmitted is present in transmit FIFO 16, but transmission through data interface controller 14 is stalled due to the interrupt. Once the frame count is registered at the output of frame counter 19, status and control logic 15 transitions from state 54 directly to state 51 where it waits for the next data frame from transmit FIFO 16 without waiting for processor 22 to clear the interrupt. Further EOF flags that are written to or read from transmit FIFO 16 will not corrupt the frame count at the output of frame counter 19 since the previous frame count was latched by interrupt signal INT.

In an alternative embodiment, the frame count is not registered, but passed through directly to processor 22.

Status and control logic 15 transitions from state 54 to state 55 where the logic waits for processor 22 to process the interrupt and then clear the interrupt signal INT by re-writing the corresponding interrupt register maintained by status and control logic 15. Once processor 22 clears the interrupt, status and control logic 15 transitions from state 55 to state 51.

By knowing the number of data frames that remain in transmit FIFO 16 after a data frame has been aborted, processor 22 can identify the particular data frame that was aborted by a variety of methods, depending upon the particular data routing circuit and software that are used in data communication circuit 10 (shown in FIG. 1). For example, when the data routing circuit includes a DMA controller, such as DMA controller 20 shown in FIG. 1, processor 22 can look at the list of buffer memory descriptors (BMDs) used by DMA controller 20 to determine how many data frames have been transferred to transmit FIFO 16 and compare that number to the number of data frames that remain in transmit FIFO 16. If the aborted data frame is still present in memory 30, processor 22 can simply append another buffer memory descriptor to the BMD list for that data frame so that the aborted data frame-will be re-transmitted through transmit FIFO 16.

Figure 3:
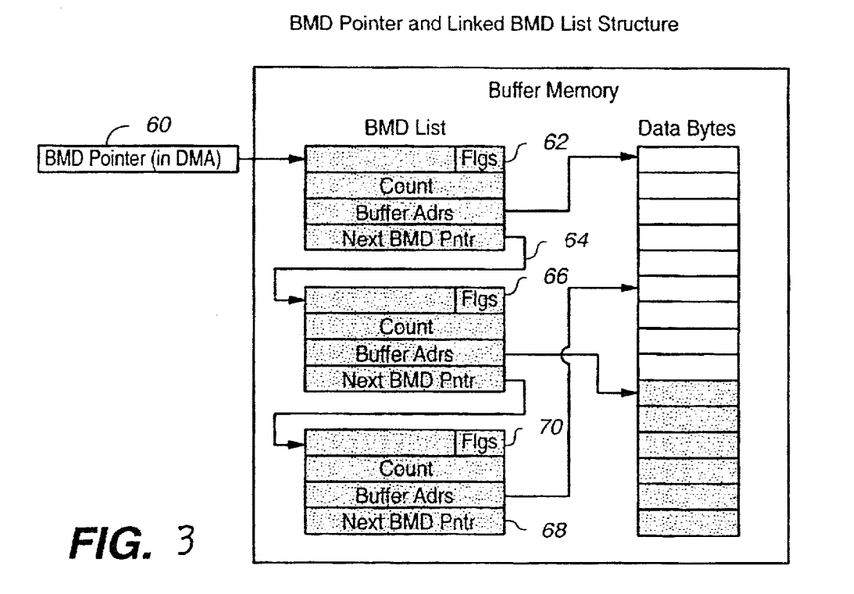
FIG. 3 is a diagram illustrating a buffer memory descriptor list used by a DMA controller within the circuit shown in FIG. 1.

For example, DMA controller 20 can include a bi-directional linked (or sequential) list DMA controller, which transfers data between data bus 24 and transmit and receive FIFOs 16 and 18. Software executed by processor 22 sets up a list of buffer memory descriptors (BMDs) in memory 30. The BMDs point to buffers in memory 30 where data will be read from or written to. A linked BMD list is a set of link accessed BMDs. An example of a BMD pointer and a linked BMD list structure is shown in FIG. 3. DMA controller 20 has a BMD pointer 60, which points to the first BMD 62 in the linked list. The next BMD pointer 64 points to the next BMD 66 in the linked list. The next BMD pointer 68 of the last BMD 70 in the list is equal to zero.

When DMA controller 20 removes one or more BMDs from the linked list, it sets its current BMD pointer 60 equal to the next BMD pointer of the current BMD:

BMD Pointer< - - - Next BMD Pntr

When processor 22 adds one or more BMDs to the end of the linked list, it sets the next BMD pointer 68 of the last BMD 70 equal to the memory address of the first BMD that is being added. Processor 22 can also add one or more BMDs to the middle of a linked list.

To determine which data frame has been aborted, processor 22 can compare the BMD list with the number of data frames remaining in transmit FIFO 16. If the aborted data frame still resides in the buffer memory section of memory 30 (i.e., has not yet been overwritten), processor 22 can simply add a new BMD for the aborted data frame to the end of the linked list, as described above. The aborted data frame will then be re-transmitted through transmit FIFO 16. Any other method of calculating or otherwise identifying the aborted data frame can also be used.

Figure 4:
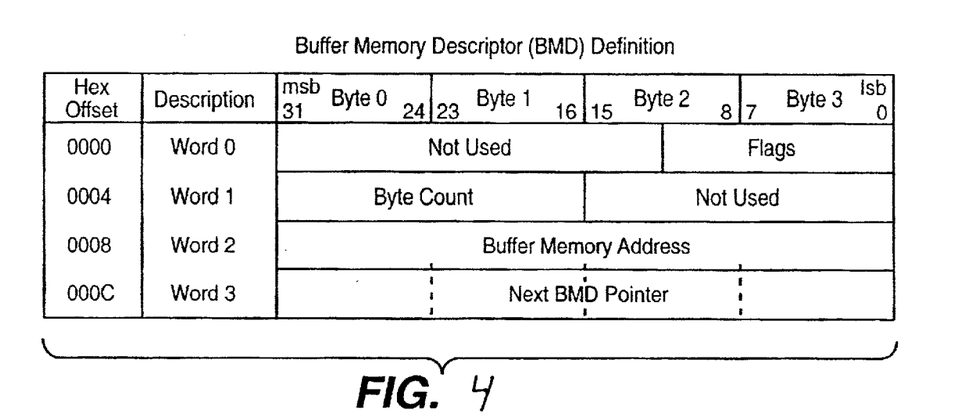
FIG. 4 is a diagram which illustrates the format of each buffer memory descriptor in the. list shown in FIG. 3.

FIG. 4 is a diagram which illustrates the format of each buffer memory descriptor according to one embodiment of the present invention. However, any buffer memory descriptor format can be used. Each buffer memory descriptor is 16 bits long and resides in a buffer memory section of memory 30. Word 0, bits 0–3 and 8–12, are the BMD flags. Word 0, bits 4–7 and 13–31 are not used. Word 1, bits 16–31 is a byte count field for the data buffer and specifies the number of bytes that are to be transferred to or from the data buffer. Word 1, bits 0–15 are not used. Word 2, bits 0–31 contains the buffer memory address of the data buffer. The data buffer can start on any address byte boundary. Word 3, bits 0–31 contains the next BMD pointer, which is the buffer memory address of the next BMD in the linked list. The end of the linked BMD list is reached when the next BMD pointer is zero.

Figure 5:
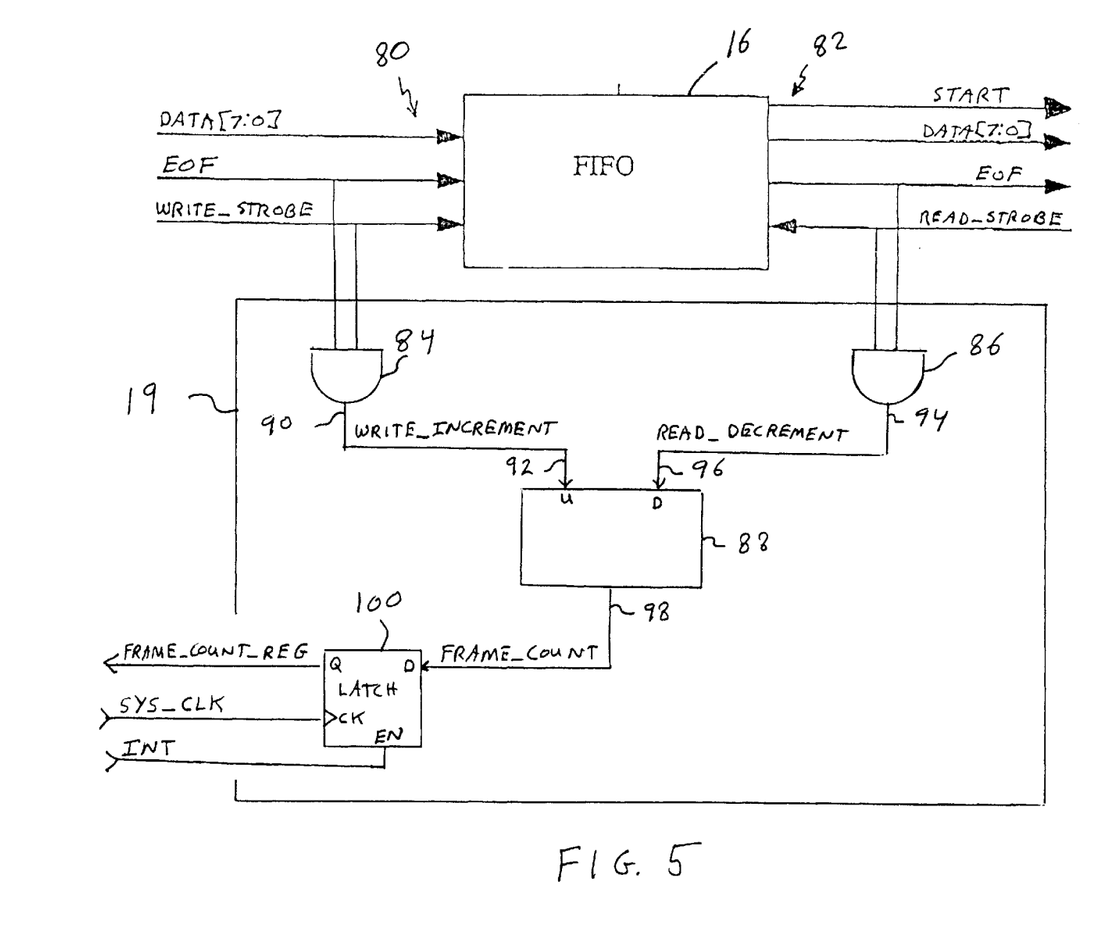
FIG. 5 is a block diagram of a FIFO buffer and frame counter used within the circuit shown in FIG. 1, according to one embodiment of the present invention.

FIG. 5 is a block diagram illustrating transmit FIFO 16 and frame counter 19 in greater detail, according to one embodiment of the present invention. Transmit FIFO 16 can be synchronous or asynchronous. Transmit FIFO 16 has a write port 80 and a read port 82. Write port 80 includes a data input labeled DATA[7:0], an end-of-frame flag input labeled EOF, and a write control input labeled WRITE_STROBE. Read port 82 includes a start threshold flag output labeled START, a data output labeled DATA[7:0], an end-of-frame flag output labeled EOF, and a read control input labeled READ_STROBE. In one embodiment, transmit FIFO 16 includes a dual-port RAM. In an alternative embodiment, a single-port RAM can be used with additional circuitry to multiplex the write and read ports 80 and 82.

During a write operation, DMA controller 20 writes each successive data frame to FIFO 16 one byte at a time by applying each byte to data input DATA[7:0] along with a corresponding EOF flag to the EOF input and then pulsing write control input WRITE_STROBE. FIFO 16 receives the write pulse and stores the data byte and corresponding EOF flag at a selected address. The control circuitry within FIFO 16 maintains a write pointer (not shown) which points to a current address within the FIFO at which the word or byte will be stored. FIFO 16 increments the address of the write pointer after each word or byte is written into the FIFO. When the last word or byte of a data frame is being written to FIFO 16, DMA controller 20 asserts the corresponding EOF flag.

When enough data has been stored in FIFO 16 to initiate a transmit operation, FIFO 16 asserts start threshold flag START, which notifies data interface controller 14 that it can start transmitting data from FIFO 16. Data interface controller 14 reads each subsequent word or byte at a fixed rate by providing a series of read pulses on read control input READ_STROBE. The control circuitry within FIFO. 16 maintains a read pointer (also not shown), which is incremented with each read pulse received on read control input READ_STROBE. As each read pulse is received on read control input READ_STROBE, FIFO 16 provides the word or byte of the data frame and its corresponding EOF flag that are stored in the address referenced by the current read pointer to data output DATA[7:0] and end-of-frame output EOF. The EOF flag is set when the last word or byte of the data frame is being read from FIFO 16. In some embodiments, the control circuitry within FIFO 16 maintains additional status flags, which reflect the amount of data stored within the FIFO.

Frame counter 19 includes logic-AND gates 84 and 86, up/down counter 88 and latch 100. AND gate 84 has first and second inputs, which are coupled to the EOF flag input and the WRITE_STOBE input, respectively, of write port 80, and has a WRITE_INCREMENT output 90. WRITE_INCREMENT output 90 is coupled to an increment control input 92 (an "UP" count input) of counter 88. AND gate 86 has first and second inputs, which are coupled to the EOF flag output and the READ_STOBE input, respectively, of read port 82, and has a READ_INCREMENT output 94. READ_INCREMENT output 94 is coupled to a decrement control input 96 (a "DOWN" count input) of counter 88. Counter 88 has a FRAME_COUNT output 98. As each active EOF flag is written into FIFO 16, counter 88 increments the FRAME_COUNT on output 98. Similarly, as each active EOF flag is read from FIFO 16, counter 88 decrements the FRAME_COUNT on output 98. Thus, the value of FRAME_COUNT reflects the total number of data frames that are presently stored in FIFO 16.

FRAME_COUNT output 98 is coupled to data input "D" of latch 100. Latch 100 has a clock input "CK", which is coupled to a system clock SYS_CLK and an enable input "EN, which is coupled to receive the interrupt signal INT from output 49 of status and control logic 15 (shown in FIG. 1). Latch 100 has a data output Q, and a data output "Q", which generates a registered frame count FRAME_COUNT_REG that is coupled to register bus 25 (also shown in FIG. 1). When INT goes active, latch 100 latches the FRAME_COUNT from data input D to data output Q on the next transition in SYS_CLK. Processor 22 can then access the registered frame count FRAME_COUNT_REG. In an alternative embodiment, latch 100 is eliminated, and FRAME_COUNT output 98 is coupled directly to an input of processor 22.

Figure 6:
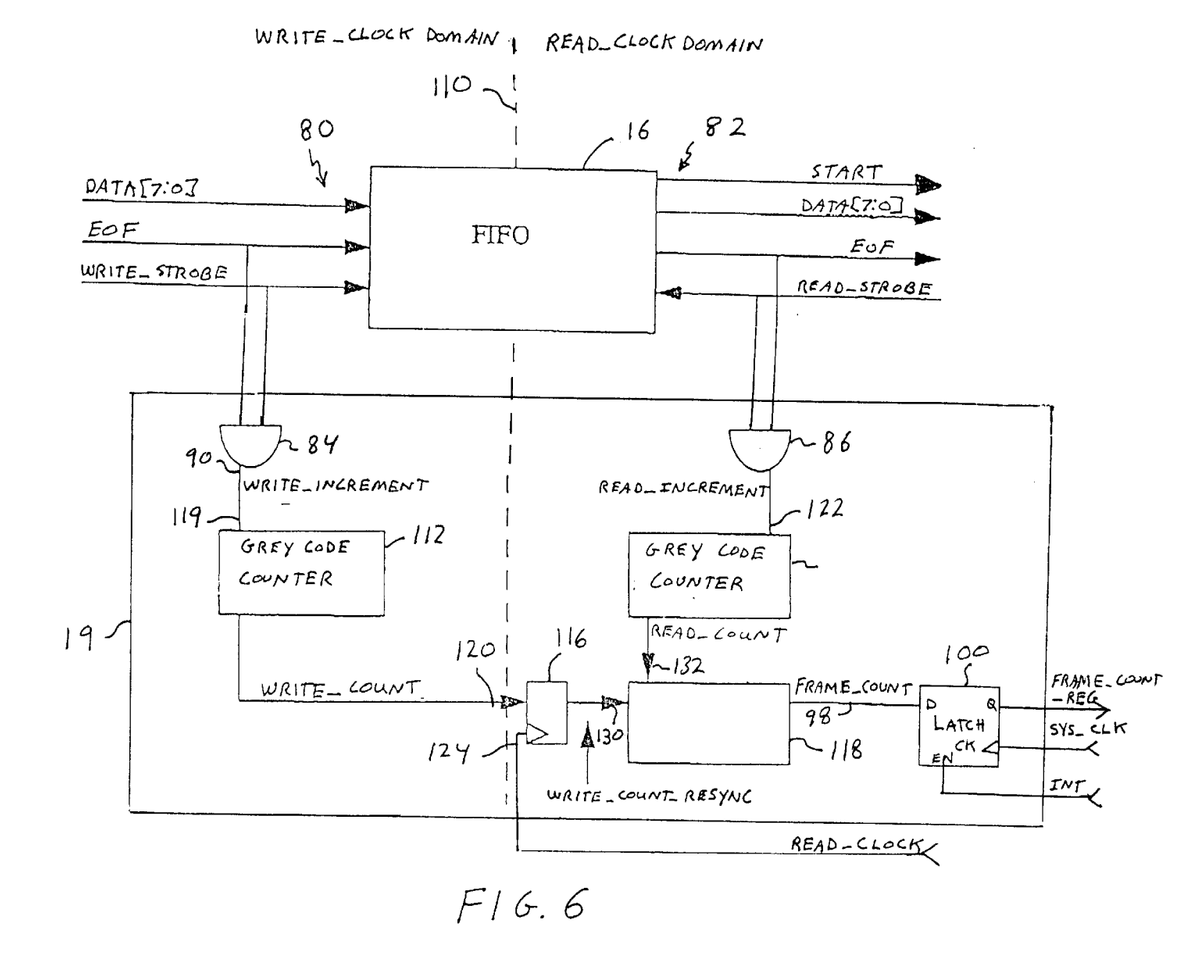
FIG. 6 is a block diagram of a FIFO buffer and frame counter used within the circuit shown in FIG. 1, according to an alternative embodiment of the present invention.

FIG. 6 is a block diagram of transmit FIFO 16 and frame counter 19 according to another alternative embodiment of the present invention, where transmit FIFO 16 is an asynchronous FIFO. The same reference numerals are used in FIG. 6 as were used in FIG. 5 for the same or similar elements. Dashed line 110 represents a dividing line between a first, WRITE_CLOCK domain and second, READ_CLOCK domain, which are asynchronous to one another. Write port 80 resides in the WRITE_CLOCK domain, while read port 82 resides in the READ_CLOCK domain.

Frame counter 19 is modified to resynchronize signals on the WRITE_CLOCK domain with signals on the READ_CLOCK domain (or, alternatively, vise versa). Frame counter 19 includes logic-AND gates 84 and 86, latch 100, grey code counters 112 and 114, re-synchronizing circuit 116 and subtractor 118. The WRITE_INCREMENT output 90 of AND gate 90 is coupled to an increment control input 119 of grey code counter 112. Grey code counter 112 has a WRITE_COUNT output, which is coupled to a data input 120 of resynchronizing circuit 116. Whenever the last byte of a data frame is being written in to FIFO 16, the EOF flag is asserted while the WRITE_STROBE input is pulsed. This causes the WRITE_INCREMENT output 90 of AND gate 84 to go high. Each time the WRITE_INCREMENT output 90 goes high, grey code counter 112 increments the WRITE_COUNT output according to a grey code in which only one bit of the WRITE_COUNT output is changed with each increment of the counter. Thus, WRITE_COUNT indicates the number of data frames that have been written to FIFO 16.

Similarly, AND gate 86 has a READ_INCREMENT output 94, which is coupled to an increment control input 122 of grey code counter 114. Grey code counter 114 has a READ_COUNT output, which increments according to a grey code each time the READ_INCREMENT output 94 goes high. The READ_INCREMENT output goes high as the last byte of a data frame is read out of FIFO 16, when the EOF flag output and the READ-STROBE input are both high. Thus, READ_COUNT indicates the number of data frames read out of FIFO 16.

Before the number of data frames that were written to FIFO 16 can be compared to the number of data frames that were read from FIFO 16, re-sync circuit 116 synchronizes the WRITE_COUNT output to the READ_CLOCK domain. In one embodiment, re-sync circuit 116 includes a flip-flop having a clock input 124, which is coupled to READ_CLOCK. READ_CLOCK is a clock signal that is synchronous with the READ_CLOCK domain. Any type of re-synchronizing circuit can be used with the present invention. The grey-coded WRITE_COUNT output limits re-synchronizing errors when the output is re-synchronized to the READ_CLOCK domain by limiting the number of changing bits per count to one.

Subtractor 118 has an addend input 130 coupled to the WRITE_COUNT_RESYNC output of re-sync circuit 116, a subtrahend input 132 coupled to the READ_COUNT output and a FRAME_COUNT output 98. Subtractor 118 subtracts the number of data frames written into FIFO 16, as indicated by WRITE_COUNT_RESYNC, with the number of data frames read from FIFO 16, as indicated by READ_COUNT, and applies the result, FRAME_COUNT, on output 98. Other types of frame counter circuits or methods of counting the data frames in FIFO 16 can be used.

The data communication circuit and transmit FIFO of the present invention gives the software executed by processor 22 the option of seamlessly re-transmitting aborted data frames or packets without relying on higher level protocols, which can introduce significant delays to the data recovery. The above-implementation gives the software the option of continuing to transmit data frames or packets after the abort flag is set or waiting for the interrupt to clear.

Although the present invention has been described with reference to preferred embodiments, workers skilled in the art will recognize that changes may be made in form and detail without departing from the spirit and scope of the invention. For example, the FIFO buffer and the frame counter can be any size. Any type of frame counting circuit or data routing circuit. The present invention can be implemented as an asynchronous or a synchronous FIFO buffer. Other modifications can also be made. The term "coupled" used in the specification and the claims can include a variety of connections, such as a direct connection or a connection through one or more intermediate elements.

What is claimed is:

1. A data transmission buffer circuit for buffering communication data, which is divided into a plurality of multiple-bit data frames that have a start and an end, the buffer circuit comprising:
   a first-in-first-out (FIFO) buffer comprising:
      a write port comprising a data input, a write control input and an end-of-frame flag input, which indicates whether the data on the data input includes the end of one of the plurality of data frames; and
      a read port comprising a data output, a read control input, and an end-of-frame flag output, which indicates whether the data on the data output includes the end of one of the plurality of data frames; and
      a frame counter, which is coupled to the write port and the read port and generates a frame count output which represents a number of data frames that are stored in the FIFO buffer.

2. The data transmission buffer circuit of claim 1 wherein the frame counter comprises:
   a first logical AND gate having a first input coupled to the end-of-frame input, a second input coupled to the write control input, and a write increment output; and
   a second logical AND gate having a first input coupled to the end-of-frame output, a second input coupled to the read control input, and a read decrement output; and
   an up-down counter, which increments the frame count output as a function of the write increment output and decrements the frame count output as a function of the read decrement output.

3. The data transmission buffer circuit of claim 1 and further comprising:
  an interrupt signal input; and
  a frame count status register having a data input, which is coupled to the frame count output, a registered frame count and a clock input, which is coupled to the interrupt signal input.

4. The data transmission buffer circuit of claim 1 wherein the frame counter comprises:
  a write end-of-frame counter coupled to the write port and having a write count output, which increments as a function of the end-of-frame input and the write control input;
  a read end-of-frame counter coupled to the read port and having a read count output, which increments as a function of the end-of-frame output and the read control input; and
  a subtractor having an addend input coupled to the write count output, a subtrahend input coupled to the read count output and a result output, which forms the frame count output.

5. A communications subsystem for transmitting communication data, which is divided into a plurality of multiple-bit data frames that have a start and an end, the subsystem comprising:
  a data bus;
  a register bus;
  a processor coupled to the data bus and the register bus;
  a data routing circuit coupled to the data bus and the register bus;
  a data interface controller having a channel output;
  a transmit first-in-first-out (FIFO) buffer coupled between the data routing circuit and the data interface controller and having storage locations adapted to store successively received ones of the data frames from the data routing circuit; and
  a frame counter having a count control input, which is coupled to the transmit FIFO buffer, and a count output, which is coupled to the register bus for access by the processor and represents a number of the data frames that are stored in the transmit FIFO.

6. The communications subsystem of claim 5 wherein:
  the data interface controller comprises an interrupt output, which is active when transmission of one of the data frames through the controller is aborted; and
  the frame counter further comprises a latch, which is coupled between the frame count output and the register bus and has a clock input coupled to the interrupt output.

7. The communications subsystem of claim 5 wherein:
  the FIFO buffer comprises:
    a write port comprising a data input, a write control input and an end-of-frame flag input, which indicates whether the data on the data input includes the end of one of the plurality of data frames; and
    a read port comprising a data output, a read control input, and an end-of-frame flag output, which indicates whether the data on the data output includes the end of one of the plurality of data frames; and
  the frame counter comprises a count increment control circuit, which is coupled to the end-of-frame input and the write control input of the write port, and a count decrement control circuit, which is coupled to the end-of-frame output and the read control input of the read port.

8. The communications subsystem of claim 7 wherein:
  the count increment control circuit comprises a first logical AND gate having a first input coupled to the end-of-frame input, a second input coupled to the write control input, and a write increment output;
  the count decrement control circuit comprises a second logical AND gate having a first input coupled to the end-of-frame output, a second input coupled to the read control input, and a read decrement output; and
  the frame counter further comprises an up-down counter, which increments the frame count output as a function of the write increment output and decrements the frame count output as a function of the read decrement output.

9. The communications subsystem of claim 5 wherein:
  the FIFO buffer comprises:
    a write port comprising a data input, a write control input and an end-of-frame flag input, which indicates whether the data on the data input includes the end of one of the plurality of data frames; and
    a read port comprising a data output, a read control input, and an end-offrame flag output, which indicates whether the data on the data output includes the end of one of the plurality of data frames; and
  the frame counter comprises:
    a write end-of-frame counter coupled to the write port and hav-ng a write -count output, which increments as a function of the end-of-frame input and the write control input;
    a read end-of-frame counter coupled to the read port and having a read count output, which increments as a function of the end-of-frame output and the read control input; and
    a subtractor having an addend input coupled to the write count output, a subtrahend input coupled to the read count output and a result output, which forms the frame count output.

10. A method of re-transmitting an aborted one of a plurality of multiple-bit data frames in a communications subsystem, the method comprising:
  retrieving successive ones of the data frames from a memory;
  transferring the successive ones of the data frames to a transmit first-in-first-out buffer;
  transmitting the successive ones of the data frames from the transmit FIFO buffer to a communications channel sequentially, wherein transmission of the aborted data frame is discontinued;
  counting a number of the successive ones of the data frames that remain in the transmit FIFO after transmission of the aborted data frame has been discontinued;
  identifying the aborted data frame based on the number; and
  transferring the aborted data frame from the memory to the transmit FIFO buffer again, after the step of identifying for re-transmission through the channel.

11. The method of claim 10 and further comprising:
  controlling the steps of retrieving, transferring the data frames, transmitting the data frames, counting, identifying and transferring the aborted data frame with a processor; and
  wherein the step of counting comprises applying the number to a register bus that is accessible by the processor.

12. The method of claim 11 wherein the step of counting further comprises:

counting the number of the successive ones of the data frames that are stored in the transmit FIFO during the steps of transferring and transmitting; and latching the number at the register bus when transmission of the aborted data frame is discontinued.

13. The method of claim 12 and further comprising:

activating an abort flag interrupt when transmission of the aborted data frame is discontinued;

halting the step of transmitting the data frames after the step of activating the abort flag interrupt and before the step of latching; and re-initiating the step of transmitting the data frames after the step of latching.

14. The method of claim 11 and further comprising:

activating an abort flag interrupt when transmission of the aborted data frame is discontinued;

halting the step of transmitting the data frames after the step of activating the abort-flag interrupt; and inactivating the abort flag interrupt and re-initiating the step of transmitting the data frames by the processor after the step of identifying.

* * * * *